(12) United States Patent
Suzuki et al.

(10) Patent No.: US 11,740,478 B2
(45) Date of Patent: Aug. 29, 2023

(54) DISPLAY DEVICE, CONTROL METHOD THEREOF, AND RECORDING MEDIUM

(71) Applicant: CANON KABUSHIKI KAISHA, Tokyo (JP)

(72) Inventors: Kyouhei Suzuki, Tokyo (JP); Ryo Yamasaki, Tokyo (JP); Makoto Oikawa, Kanagawa (JP); Shunsuke Ninomiya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/885,653

(22) Filed: Aug. 11, 2022

(65) Prior Publication Data

US 2023/0068868 A1 Mar. 2, 2023

(30) Foreign Application Priority Data

Aug. 26, 2021 (JP) .................................. 2021-138310

(51) Int. Cl.
*G02B 27/01* (2006.01)

(52) U.S. Cl.
CPC ..... *G02B 27/0179* (2013.01); *G02B 27/0172* (2013.01); *G02B 2027/014* (2013.01); *G02B 2027/0134* (2013.01); *G02B 2027/0187* (2013.01)

(58) Field of Classification Search
USPC ........................................................... 345/7
See application file for complete search history.

(56) References Cited

U.S. PATENT DOCUMENTS

| 5,153,569 | A  | * | 10/1992 | Kawamura | .......... | H04N 13/344 |
|---|---|---|---|---|---|---|
|  |  |  |  |  |  | 348/E13.041 |
| 5,737,012 | A  | * | 4/1998 | Tabata | .................. | H04N 13/296 |
|  |  |  |  |  |  | 348/E13.047 |
| 11,137,610 | B1 | * | 10/2021 | Kessler | .............. | G02B 27/0176 |
| 2009/0185137 | A1 | * | 7/2009 | Krall | ....................... | A61B 3/08 |
|  |  |  |  |  |  | 351/239 |
| 2009/0238334 | A1 | * | 9/2009 | Brahme | ............... | A61B 6/4092 |
|  |  |  |  |  |  | 378/41 |
| 2012/0069448 | A1 | * | 3/2012 | Sugihara | ............ | G02B 27/0176 |
|  |  |  |  |  |  | 359/643 |
| 2015/0198809 | A1 | * | 7/2015 | Wei | ..................... | G02B 27/0172 |
|  |  |  |  |  |  | 359/567 |

(Continued)

FOREIGN PATENT DOCUMENTS

JP 2006-195084 A 7/2006

*Primary Examiner* — Chineyere D Wills-Burns
(74) *Attorney, Agent, or Firm* — Cowan, Liebowitz & Latman, P.C.

(57) ABSTRACT

A display unit and a lens included in a display device constitute a plurality of display optical systems that display a video for each of a user's left eye and right eye. The display device includes a diopter change instruction unit and a diopter change driving unit that can change a diopter related to the plurality of display optical systems, and an object position calculation unit that calculates an object position of a display object in a video. The diopter change instruction unit gives a driving instruction to the diopter change driving unit on the basis of information acquired from a user information recording unit and an operation mode recording unit that record information on usage conditions of the display device.

10 Claims, 7 Drawing Sheets

(56) References Cited

U.S. PATENT DOCUMENTS

2017/0161951 A1* 6/2017 Fix .................... G06V 40/19
2017/0237974 A1* 8/2017 Samec ................ H04N 13/122
                                                        348/53

* cited by examiner

DISPLAY DEVICE, CONTROL METHOD THEREOF, AND RECORDING MEDIUM

BACKGROUND OF THE INVENTION

Field of the Invention

The present invention relates to technology of diopter adjustment in a display device.

Description of the Related Art

There are a video display device used by being worn on a user's head, and a video display device used by being worn on a user like spectacles. A display unit is disposed near a user's eyes, and a parallax video is displayed for each of the user's right and left eyes. When the user visually recognizes the displayed parallax video, a stereoscopic effect on an object displayed in the parallax video is obtained.

Japanese Patent Laid-Open No. 2006-195084 discloses technology reducing a sense of discomfort with respect to a displayed image and reducing an observer's motion sickness during continuous use for a long period of time. Based on the condition of a user's eyes, image processing is performed so as to blur other parts of a displayed parallax video except for a part in focus on the retina.

Incidentally, when a human views an object, a convergence angle, which is an angle at which lines of sight of the two eyes intersect, and a focal length of the crystalline lens in the eyeball change according to a distance from the object to the eye. In a reality space, a relationship between the convergence angle and the focal length of the crystalline lens is substantially the same at all times.

In the related art disclosed in Japanese Patent Laid-Open No. 2006-195084, changes in an object position are expressed by a displayed parallax video, but a display position (diopter) of the parallax video in an optical axis direction of the video display device is fixed at all times. Thus, when a user views an image of a certain object which is displayed as a parallax video, a convergence angle of the user changes according to the position of the object. At this time, a focal length of the crystalline lens changes according to the size of the convergence angle on the basis of experiences in the reality space. In this case, there is a possibility that the focal length of the crystalline lens and the diopter of the video display device will be inconsistent with each other. As a result, good visibility may not be able to be secured for the user, for example, difficulty in being able to view a displayed parallax video clearly due to the parallax video being out of focus.

Thus, in diopter adjustment of the video display device, it is preferable to change a diopter in accordance with the position of an object in a parallax video for determining a convergence angle of a user by a method of driving a lens in the device, or the like. However, a relationship between the user's convergence angle and a focal length of the crystalline lens varies depending on individuals because of the influence of one's age, eyesight, or the like. If the diopter is changed uniformly according to the position of a displayed object in a parallax video on the video display device, some users may have difficulty in clearly viewing the displayed parallax video due to the parallax video being out of focus and good visibility may not be able to be secured. In addition, an appropriate lens driving speed may vary depending on whether the video display device is in a normal mode in which power consumption is not reduced or in a power saving mode for long-term use. An appropriate diopter change operation may vary depending on usage conditions including such differences in users (individual differences) and the operation mode of the video display device.

SUMMARY OF THE INVENTION

The present invention provides a display device capable of changing a diopter corresponding to usage conditions.

A display device according to an embodiment of the present invention is a display device including first and second display optical systems that display a video for each of a user's left eye and right eye, the display device including calculation means for calculating an object position of a display object in the video displayed by the first and second display optical systems, and diopter change means for changing a diopter related to the first and second display optical systems based on information of the object position and information of usage conditions of the display device.

Further features of the present invention will become apparent from the following description of exemplary embodiments with reference to the attached drawings.

DESCRIPTION OF THE EMBODIMENTS

Hereinafter, an embodiment of the present invention will be described in detail with reference to the accompanying drawings. In the embodiment, an example of diopter change control in a head-mounted type or spectacles type video display device is described, but the present invention can be applied to various types of display devices capable of displaying a parallax video. Note that the parallax video is a video having a parallax, the parallax video being constituted by a plurality of images having different viewpoints.

Figure 1:
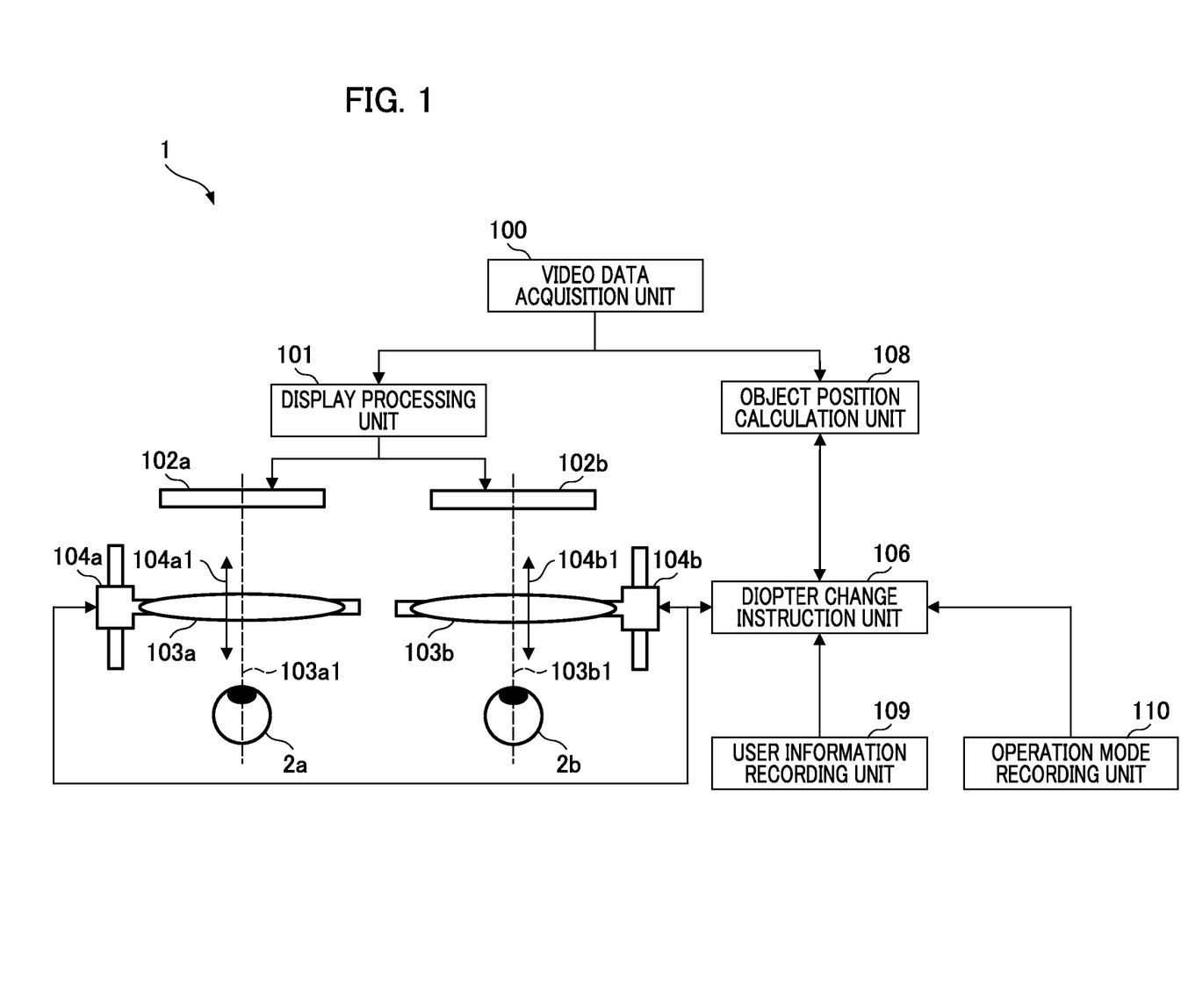
FIG. 1 is a schematic view illustrating a schematic configuration of a video display device of the present embodiment.

FIG. 1 is a diagram illustrating a schematic configuration of a video display device 1 according to the present embodiment. Details of each unit will be described later, and a video data acquisition unit 100, a display processing unit 101, a diopter change instruction unit 106, an object position calculation unit 108, a user information recording unit 109, and an operation mode recording unit 110 are realized by one or more processors such as a CPU reading and executing programs. The video display device 1 can be used by being worn on a user's head and can be used by being worn like spectacles. In any form, the video display device 1 can be fixed in the vicinity of each of the user's left eye 2a and right eye 2b. Note that a distinction is made by adding a sign a to reference numerals of components related to the user's left eye 2a and adding a sign b to reference numerals of components related to the user's right eye 2b.

The video display device 1 includes the video data acquisition unit 100 and the display processing unit 101. The video data acquisition unit 100 acquires video data for display through an external device, a network, or the like. The display processing unit 101 performs display magnification adjustment processing on the acquired video data. The processed video data is transmitted to two displays units 102a and 102b and displayed. For example, there is a configuration in which video data is divided into data for two display units 102a and 102b and displayed. The present invention is not limited to this configuration, and a configuration may be adopted in which a screen of one display unit is divided into two screens, and video data is displayed on the two separate screens.

The video display device 1 includes first and second display optical systems corresponding to the left eye 2a and the right eye 2b. The first display optical system includes a lens 103a, and the second display optical system includes a lens 103b. The video displayed on the display units 102a and 102b is presented to the left eye 2a and the right eye 2b through the corresponding lenses 103a and 103b.

Diopter change driving units 104a and 104b have a driving source such as a motor and perform driving of the lenses 103a and 103b, respectively. That is, the lenses 103a and 103b are moved in directions (see arrows 104a1 and 104b1) along the optical axes thereof by the diopter change driving units 104a and 104b. In the present embodiment, description is given on the assumption that optical axes 103a1 and 103b1 of the lenses 103a and 103b pass through the centers of the display units 102a and 102b and the eyes 2a and 2b, but this is not limiting.

Figure 2A:
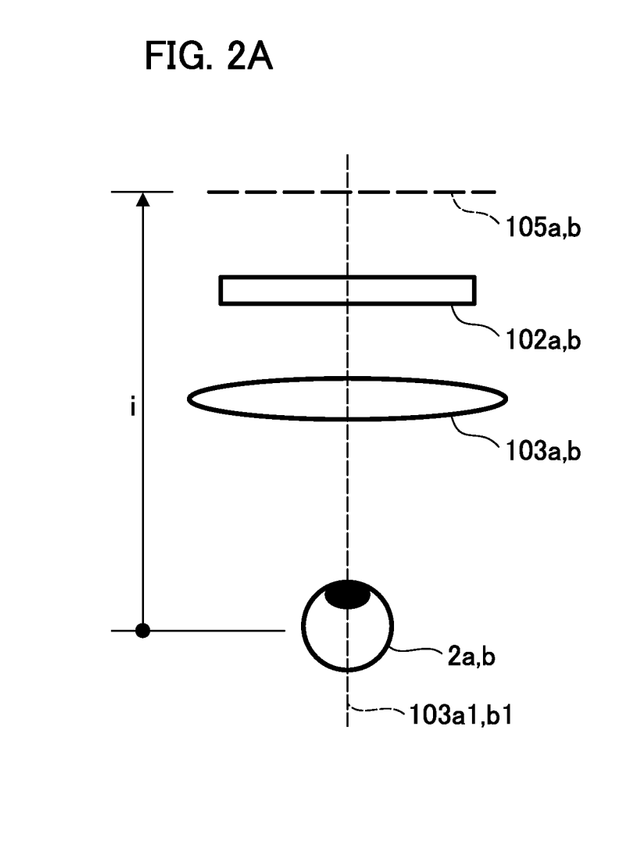
FIGS. 2A and 2B are schematic views illustrating a state where a lens is moved in the video display device.
Figure 2B:
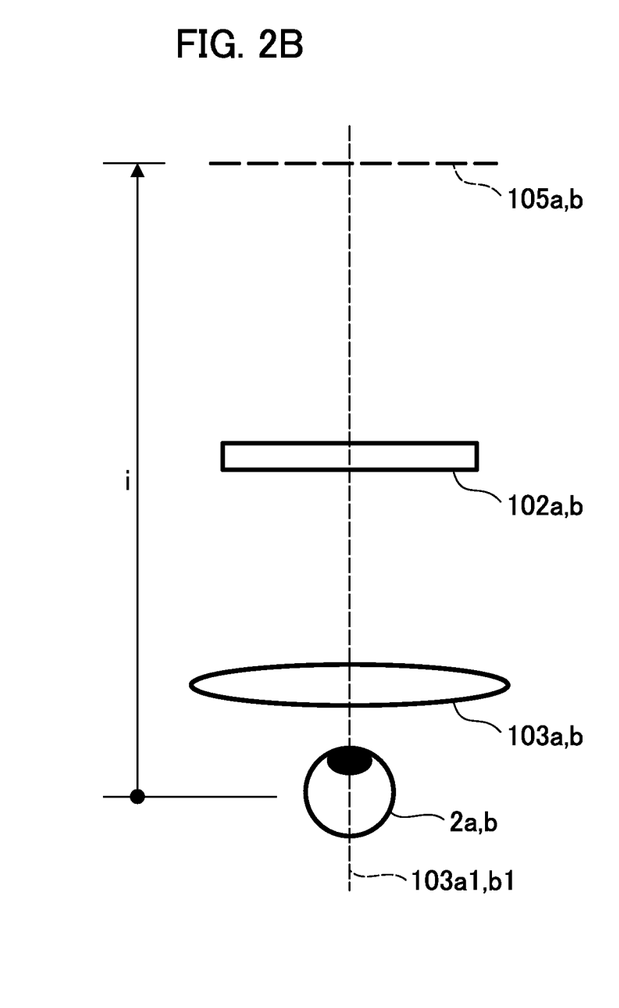

FIGS. 2A and 2B are diagrams illustrating a state where the lenses 103a and 103b are moved by the diopter change driving units 104a and 104b. FIG. 2A is a diagram illustrating a state where the lenses 103a and 103b are respectively moved near the display units 102a and 102b. FIG. 2B is a diagram illustrating a state where the lenses 103a and 103b are respectively moved near the eyes 2a and 2b. A user who is an observer visually recognizes virtual images 105a and 105b when the user views the display units 102a and 102b with the eyes 2a and 2b through the lenses 103a and 103b. The positions of the virtual images 105a and 105b in the directions of the optical axes 103a1 and 103b1 based on the positions of the observer's eyes 2a and 2b are defined as a virtual image forming position i.

As illustrated in FIGS. 2A and 2B, the virtual image forming position i can be changed by changing the positions of the lenses 103a and 103b. For example, as the lenses 103a and 103b approach the display units 102a and 102b, the virtual image forming position i approaches the eyes 2a and 2b. In contrast, when the lenses 103a and 103b approach the eyes 2a and 2b, the virtual image forming position i recedes from the eyes 2a and 2b. Thus, the diopter can be changed by moving the lenses 103a and 103b by the diopter change driving units 104a and 104b.

In the present embodiment, a configuration has been described in which when the lenses 103a and 103b approach the display units 102a and 102b, and the virtual image forming position i approaches the eyes 2a and 2b, but the present invention is not limited thereto. A configuration may also be adopted in which when the lenses 103a and 103b approach the display units 102a and 102b, and the virtual image forming position i recedes from the eyes 2a and 2b. In addition, a configuration in which the lenses 103a and 103b are moved by the diopter change driving units 104a and 104b in order to change the diopter has been described, but the present invention is not limited to the movement of an optical member. For example, a configuration in which the display units 102a and 102b are moved by the diopter change driving units 104a and 104b may be adopted. In addition, an embodiment may be adopted in which the diopter change driving units 104a and 104b are configured by adopting a method not accompanied by the movement of the lenses 103a and 103b, for example, a method using a liquid lens, or the like. In addition, a motor driving method in a configuration in which the diopter is changed using a motor is not limited, but a motor having a high quietness is preferable for the video display device 1 because the video display device is positioned near an observer's ear. For example, a voice coil motor, a vibration wave motor, or the like is preferable. Further, in FIG. 1 to FIG. 2B, the number of each of the lenses 103a and 103b illustrated is one, but the number of each of the lenses may be two or more, or a configuration in which the positions of the plurality of lenses are moved at the time of changing the diopter may be adopted.

The diopter change instruction unit 106 in FIG. 1 determines the amount of change in the diopter with respect to the position of a display object in a display video and gives an instruction corresponding to the amount of change. Specifically, the diopter change instruction unit 106 acquires information of the present virtual image forming position i from the diopter change driving units 104a and 104b, determines the next virtual image forming position i, and gives an instruction to the diopter change driving units 104a and 104b. Here, the virtual image forming position i and the positions of the lenses 103a and 103b have a correspondence relationship, and thus information of the present positions of the lenses 103a and 103b may be used as the information of the present virtual image forming position i. In the case of a configuration in which the display units 102a and 102b are moved, information of the present positions of the display units 102a and 102b may be used as the information of the present virtual image forming position i. As described above, information of relative positions of the display units 102a and 102b and the lenses 103a and 103b may be used as the information of the present virtual image forming position i.

Figure 3:
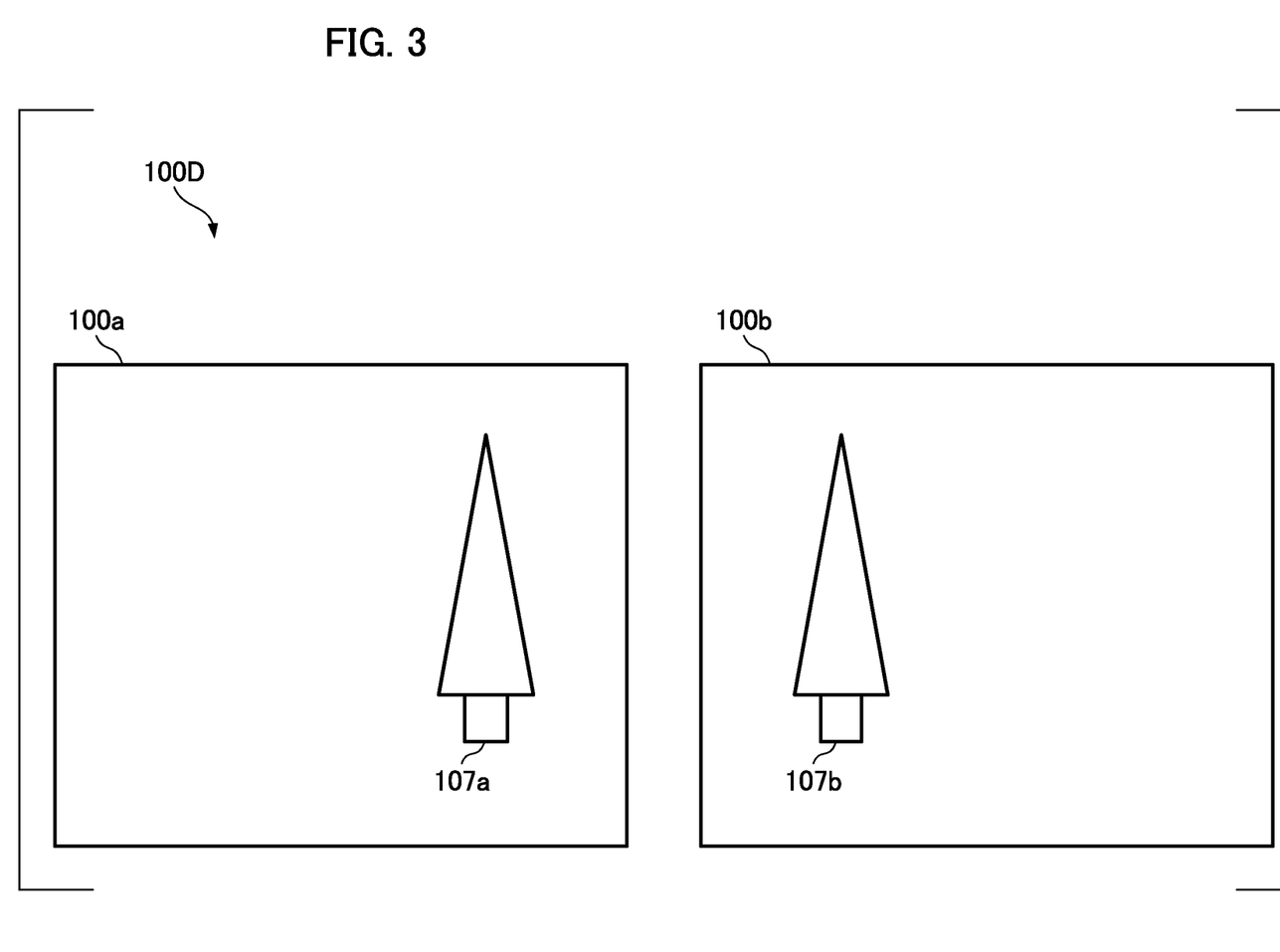
FIG. 3 is a schematic view illustrating an example of video data.

Video data will be described with reference to FIG. 3. FIG. 3 is a schematic view illustrating an example of video data 100D. The video data 100D is constituted by, for example, data of a left eye video 100a displayed on the display unit 102a for the left eye and a right eye video 100b displayed on the display unit 102b for the right eye.

Although an example in which the video data 100D is constituted by the pieces of data of two videos 100a and 100b is described in the present embodiment, the present invention is not limited thereto. For example, a configuration in which a parallax video processed by the display processing unit 101 on the basis of three-dimensional data and displayed on each of the two display units 102a and 102b is generated may be adopted. In addition, data of a video captured by a camera mounted on the video display device 1 may be adopted as at least a portion of the video data 100D. With such a configuration, a video can be displayed in an expression format of an augmented reality space by the video display device 1. For example, the video data 100D is created by superimposing a video captured by the camera mounted on the video display device 1 and a video based on three-dimensional data created in advance, and a composite video is displayed.

As illustrated in FIG. 3, data of display objects 107a and 107b is included in data of the left eye video 100a and the right eye video 100b. In the present embodiment, a case where the number of each of the display objects 107a and 107b is one is described, but the present invention is not limited thereto. For example, a configuration in which a plurality of objects are displayed in a video captured by a camera may be adopted. In this case, for example, a visual line direction detection sensor capable of detecting visual line directions of the user's eyes 2a and 2b is mounted on the device. Processing for treating an object to which the user's line of sight is directed as the display objects 107a and 107b is performed.

Figure 4:
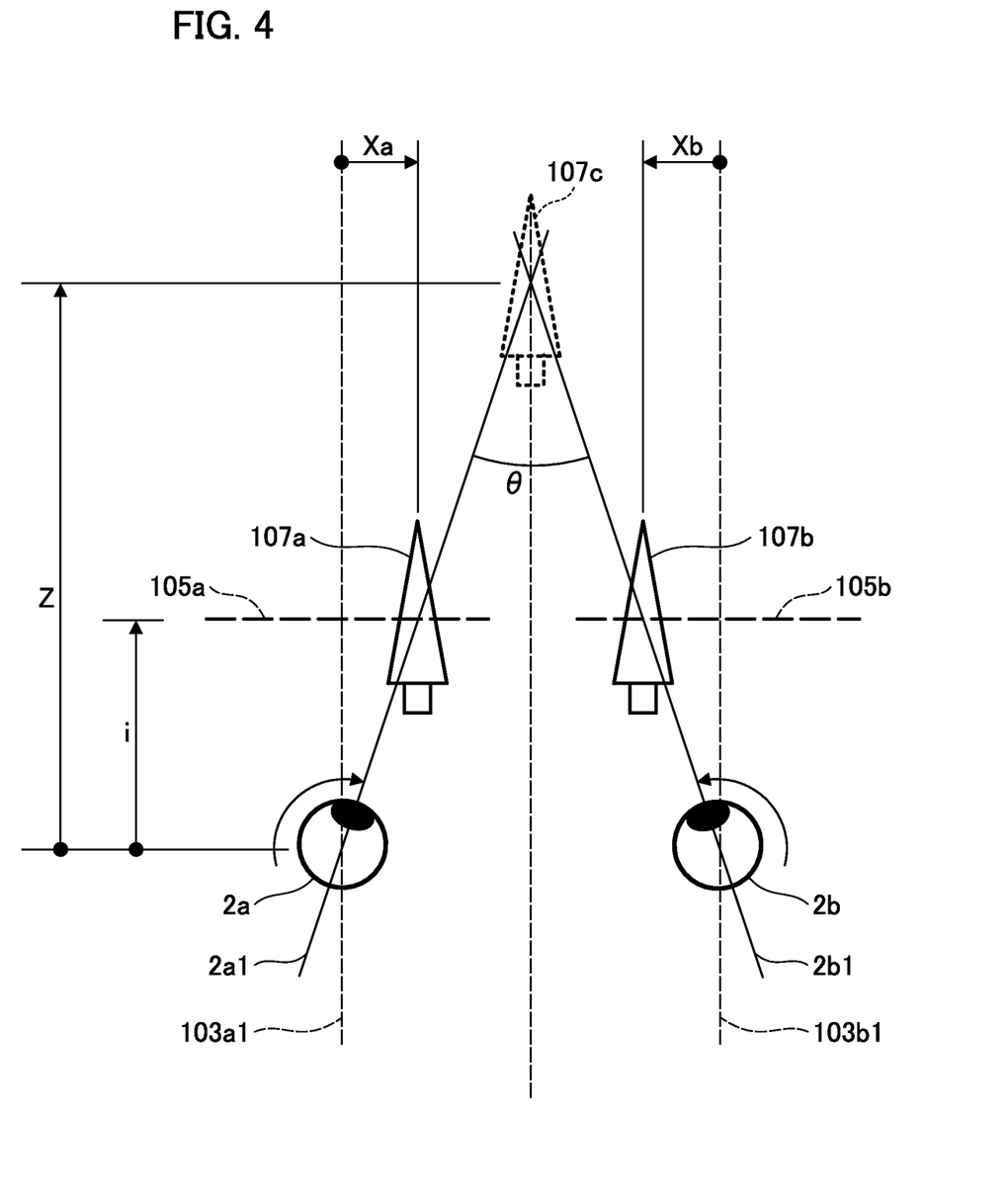
FIG. 4 is a schematic view illustrating a state where an observer views a video on a display unit with eyes through a lens.

FIG. 4 is a schematic view illustrating a state where an observer visually observes a display video through a lens. The left eye video 100a corresponding to the video data 100D illustrated in FIG. 3 is displayed on the display unit 102a for the left eye, and the right eye video 100b is displayed on the display unit 102b for the right eye. The observer observes the display videos on the display units 102a and 102b with the eyes 2a and 2b through the lenses 103a and 103b. At this time, the virtual images 105a and 105b are reflected in the observer's eyes 2a and 2b as illustrated in FIG. 4. The display objects 107a and 107b are respectively displayed at positions separated from the optical axes 103a1 and 103b1 at distances Xa and Xb in the virtual images 105a and 105b in directions perpendicular to the optical axes 103a1 and 103b1.

When the observer gazes at the display objects 107a and 107b with the eyes 2a and 2b, respectively, the eyes 2a and 2b rotate as indicated by arrows and face the display objects 107a and 107b, respectively. At this time, optical axes 2a1 and 2b1 of the crystalline lenses of the eyes 2a and 2b are inclined so as to pass through the display objects 107a and 107b, respectively. An angle formed by the optical axis 2a1 and the optical axis 2b1 is referred to as a convergence angle θ. In this state, the display objects 107a and 107b fuse and appear as one object to the observer. That is, a display object 107c appears to exist at a virtual object position Z in the direction of the optical axes 103a1 and 103b1 with the positions of the eyes 2a and 2b as a reference. There is a correlation between the position Z of the object visually recognized by the observer and the convergence angle θ, and human beings have this correlation as a sensation obtained from daily experience. Thus, the observer (user) recognizes that the display object 107c exists at the virtual object position Z on the basis of the convergence angle θ when the observer views the display objects 107a and 107b.

The object position calculation unit 108 illustrated in FIG. 1 can calculate the virtual object position Z from geometric calculation of the relationship illustrated in FIG. 4 on the basis of the distances Xa and Xb of the display objects 107a and 107b related to the video data 100D from the optical axes 103a1 and 103b1.

The user information recording unit 109 and the operation mode recording unit 110 illustrated in FIG. 1 are examples of a usage condition recording unit that records information of usage conditions of the video display device 1 in a memory connected to a processor. Although examples of user information and information of an operation mode are described in the present embodiment, the present invention is not limited thereto, and various changes and modifications can be made without departing from the scope of the present invention.

Figure 5:
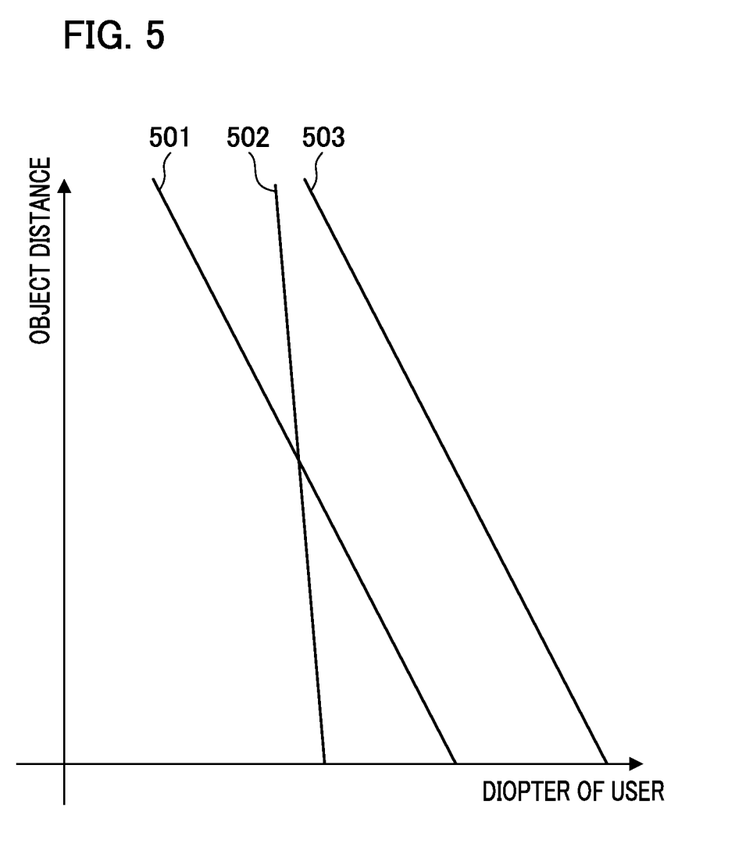
FIG. 5 is a schematic view illustrating the amount of change in the diopter of a user with respect to an object distance.

The user information recording unit 109 can record user information. A specific example will be described with reference to FIG. 5. FIG. 5 is a graph schematically showing the amount of change in a user's diopter (horizontal axis) with respect to an object distance (vertical axis). As indicated by a line 501 in FIG. 5, the diopter of a person generally changes according to an object distance. The diopter changes to be adjusted to a close position in a case where a person is viewing an object with a short object distance, and conversely, the diopter changes to be adjusted to a distant position in a case where a person is viewing an object with a long object distance. As a result, a person can clearly view an object regardless of whether the object has a short object distance or a long object distance.

In the case of a relationship between an object distance and a diopter which is distance indicated by a line 501 in FIG. 5, as the object distance changes, the diopter changes greatly. On the other hand, in the case of a relationship between an object distance and a diopter which is distance indicated by a line 502, even when the object distance changes, the diopter does not change much. This may be due to, for example, a decrease in the focusing ability of a crystalline lens of an eye caused by the influence of aging. For this reason, there is a tendency for many people to show a relationship as indicated by the line 501 in the case of young people, and there is a tendency for many people to show a relationship as indicated by the line 502 in the case of middle-aged people. In the case of a person showing a relationship as indicated by the line 502, the range of an object distance at which an object can be clearly viewed is narrow, and it is often difficult to clearly view an object with a long or short object distance. In the case of such a person, by using spectacles having different diopters depending on the position where an object is viewed, such as reading glasses, the object can be clearly viewed even when the object has a long or short object distance.

In the case of a relationship between an object distance and a diopter which is indicated by a line 503 in FIG. 5, although a relationship between the amount of change in object distance and the amount of change in diopter is the same as in the case of the line 501, a diopter at the same object distance is different. This is a case where an object distance at which an object can be viewed clearly is different due to the influence of myopia, hyperopia, or the like. In the case of such a person, spectacles for performing correction so that an object distance and a diopter have a relationship as indicated by the line 501 may be often used.

As described above, there are individual differences in diopters of users with respect to an object distance, and the amount of change in diopter with respect to the amount of change in the object distance varies for each individual. The user information recording unit 109 records information based on a relationship between an object distance and a diopter for each user. In a recording method, for example, the display units 102a and 102b perform display for diopter measurement of different virtual object positions Z. The diopter is changed by the diopter change driving units 104a and 104b, and processing for recording the positions of the lenses 103a and 103b of which the diopters match the virtual object position Z is executed. In addition, it is possible to roughly estimate whether a change in the diopter of a user is close to the characteristic indicated by the line 501 or the characteristic indicated by the line 502 depending on the age. For this reason, for example, there is a method in which processing of inputting a user's age is performed at the time of use, and data estimated from the input age is recorded in the user information recording unit 109. Note that a method of recording information to be recorded in the user information recording unit 109 is not limited to a specific method.

The operation mode recording unit 110 illustrated in FIG. 1 can record an operation mode of the video display device 1. Specifically, the video display device 1 has a normal mode in which power consumption is not reduced and a power saving mode. The operation mode recording unit 110 records data indicating which of the two modes is set. Note that the above-described two modes are examples, and data in various operation modes can be recorded in the operation mode recording unit 110 as necessary.

Figure 6:
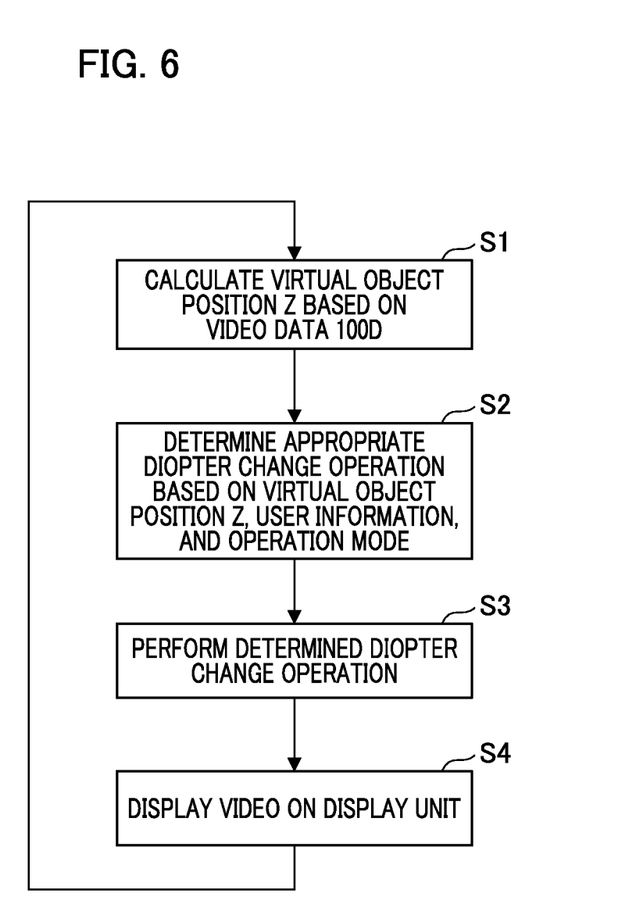
FIG. 6 is a flowchart illustrating operations of the video display device.

Operations of the video display device 1 will be described with reference to the flowchart of FIG. 6. The flowchart of FIG. 6 is executed from S1 when video display in the display units 102*a* and 102*b* is started by turning on the power supply of the video display device 1, or the like. In S1, the object position calculation unit 108 calculates a virtual object position Z in a case where a user views the display objects 107*a* and 107*b* related to the video data 100D with the eyes 2*a* and 2*b*.

In S2, the diopter change instruction unit 106 calculates appropriate operation instruction information with respect to a diopter change operation performed by the diopter change driving units 104*a* and 104*b*. At this time, information of the virtual object position Z calculated in S1, user information recorded in each of the user information recording unit 109 and the operation mode recording unit 110, and information of an operation mode are used.

The user information used in S2 is, for example, information based on a relationship between an object distance and a diopter related to a user as illustrated in FIG. 5. The diopter change instruction unit 106 calculates instruction information of a diopter change operation performed by the diopter change driving units 104*a* and 104*b* on the basis of the relationship between the object distance and the diopter related to the user.

Figure 7:
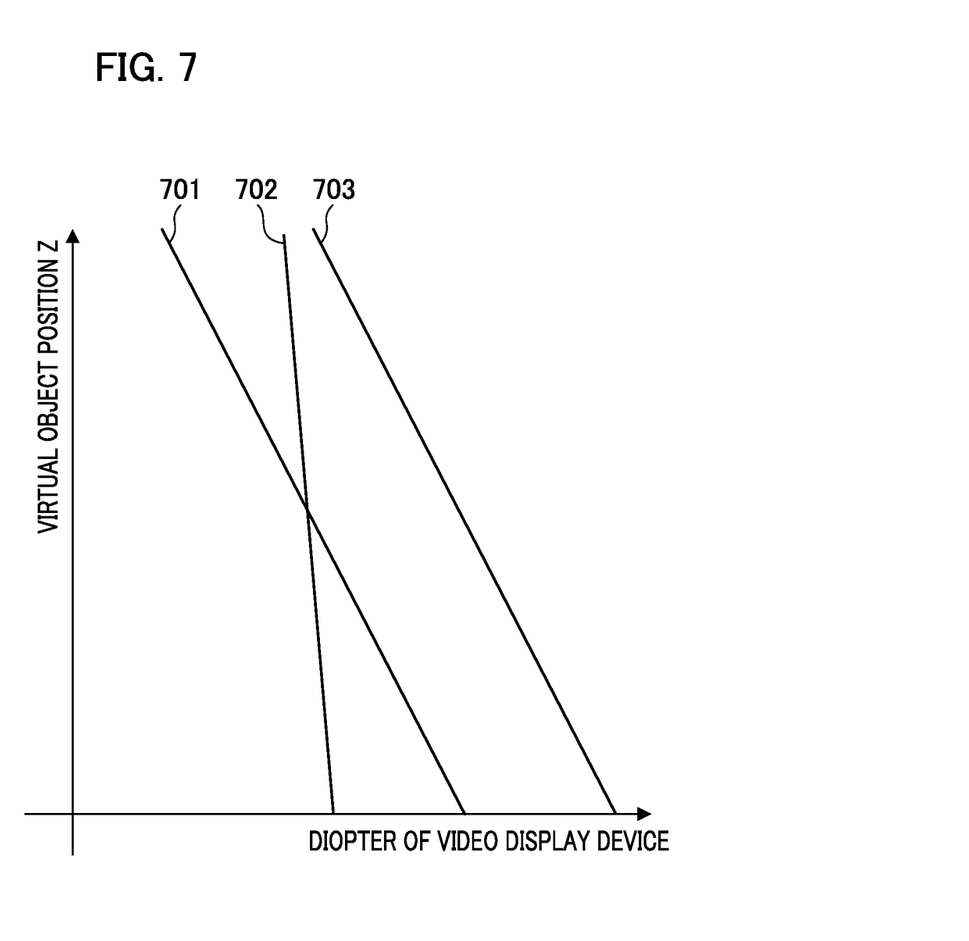
FIG. 7 is a schematic view illustrating a diopter change operation of the video display device.

FIG. 7 is a graph showing a relationship between a virtual object position Z (vertical axis) and a diopter (horizontal axis) of the video display device 1 which is calculated by the diopter change instruction unit 106. For example, a first user having the characteristic indicated by the line 501 in FIG. 5 is assumed. In this case, an operation instruction for the diopter change driving units 104*a* and 104*b* is given so as to obtain a characteristic indicated by a line 701 in FIG. 7. In addition, in the case of second and third users having the characteristics indicated by the lines 502 and 503 in FIG. 5, an operation instruction for the diopter change driving units 104*a* and 104*b* is given so as to obtain characteristics indicated by lines 702 and 703 in FIG. 7. Thus, in the case of the second user, a diopter change range of the video display device 1 becomes narrower than in the case of the first user. Further, in the case of the third user, a diopter change range of the video display device 1 is the same as in the case of the first user, but a diopter is different in a case where the virtual object position Z is the same. By performing the diopter change operation according to a user in this manner, an appropriate diopter can be clearly displayed regardless of a difference between users even when the amount of change in the diopter with respect to an object distance differs for each user.

In addition, the information of the operation mode used in S2 of FIG. 6 is information of an operation mode recorded in the operation mode recording unit 110. In S2, a speed during the driving of the diopter change driving units 104*a* and 104*b* changes in accordance with an operation mode so that a diopter calculated on the basis of a virtual object position Z and user information is set. In a case where the operation mode recorded in the operation mode recording unit 110 is a normal mode, the diopter change driving units 104*a* and 104*b* change a diopter at a maximum speed at which the diopter change driving units can be driven. On the other hand, in a case where the operation mode recorded in the operation mode recording unit 110 is a power saving mode, the diopter change driving units 104*a* and 104*b* change a diopter at a speed lower than a driving speed in the case of a normal mode. When a driving speed for changing a diopter is low, a timing when a diopter does not match occurs, which leads to a possibility that a sense of incompatibility of display will occur. In order to suppress a sense of incompatibility of display, it is preferable to increase the driving speed for changing the diopter as much as possible. On the other hand, in order to increase the driving speed for changing the diopter, it is necessary to drive the lenses 103*a* and 103*b* at high speed, which requires more power. Thus, in the case of the normal mode, the diopter is changed at a higher driving speed in order to suppress a sense of incompatibility of display as much as possible. Further, in the case of the power saving mode, some sense of incompatibility of display is permitted, and the diopter is changed at a driving speed which is lower than in the case of the normal mode, the driving speed being a speed at which less power is consumed. That is, it is possible to perform control of adjusting a driving time for changing the diopter in accordance with an operation mode. With such a configuration, it is possible to realize appropriate driving in accordance with usage conditions of the video display device 1.

In the present embodiment, a configuration has been described in which operation control for appropriately changing a diopter by using both user information and an operation mode is performed. The present invention is not limited thereto, and a configuration may be adopted in which operation control for appropriately changing a diopter on the basis of user information or an operation mode is performed. For example, a driving speed for changing a diopter may be changed on the basis of user information, or a driving speed for changing a diopter may be set to be lower in a case where a diopter change range is narrow than in a case where a diopter change range is wide. In addition, a configuration may be adopted in which operation control for changing a diopter with respect to a virtual object position Z on the basis of information other than the user information and the operation mode is performed.

In S3 of FIG. 6, the diopter change instruction unit 106 gives an instruction for the diopter change operation determined in S2 to each of the diopter change driving units 104*a* and 104*b*, and the diopter change driving units 104*a* and 104*b* are operated. A diopter of the video display device 1 is changed by driving the lenses 103*a* and 103*b*. Next, in S4, the display units 102*a* and 102*b* displays a video corresponding to the video data 100D in response to an instruction of the display processing unit 101.

In the present embodiment, a configuration in which display processing of the display units 102*a* and 102*b* is performed in S4 after the diopter change operation performed in S3 is adopted. The present invention is not limited thereto, and a configuration in which the processes of S3 and S4 are performed at the same time or a configuration in which the process of S4 is executed before S3 may be adopted.

With the above-described configuration, a diopter change operation based on the virtual object position Z can be appropriately performed according to usage conditions of the video display device 1 such as differences between users and an operation mode. An appropriate diopter change operation can be realized regardless of usage conditions of the video display device 1, such as individual differences in a relationship between an object distance and a diopter which is different for each user, or the like, and differences in an operation mode of the video display device 1. According to the present embodiment, display can be clearly performed regardless of the virtual object position Z even when users are different, and the video display device 1 can be used for a long period of time depending on usage conditions. Note that information of a user, which is information on the usage conditions of the video display device 1, and the like may be input by the user or an external device each time the video display device is used.

Although the preferred embodiment of the present invention has been described above, the present invention is not limited to the embodiment, and various modifications and changes can be made within the scope of the gist thereof.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-138310, filed Aug. 26, 2021, which is hereby incorporated by reference wherein in its entirety.

What is claimed is:

1. A display device including first and second display optical systems including display that display a video for each of user's left eye and right eye, the display device comprising:
at least one processor and memory holding a program which makes the processor perform:
calculating an object position of a display object in the video displayed by the first and second display optical systems; and
changing a diopter related to the first and second display optical systems based on the object position and information of usage conditions of the display device.

2. The display device according to claim 1, wherein the processor further performs recording of the information of the usage conditions.

3. The display device according to claim 2, wherein the recording records information on a user or information of an operation mode of the display device as the information of the usage conditions.

4. The display device according to claim 2, wherein the changing step determines the amount of change in a diopter with respect to the object position from the information of the usage conditions.

5. The display device according to claim 4, wherein the recording records information of the amount of change in a diopter with respect to an object distance as the information on the user, and
the changing step determines the amount of change using the information on the user which is acquired in the recording.

6. The display device according to claim 4, wherein the recording records information of an operation mode of the display device, and
the changing step adjusts a time at which a diopter with respect to the object position is changed, by using the information of the operation mode which is acquired in the recording.

7. The display device according to claim 6, wherein the operation mode is a first mode and a second mode in which power consumption is suppressed more than in the first mode, and
the changing step is able to change a diopter at a first speed in the first mode and change a diopter at a second speed lower than the first speed in the second mode.

8. The display device according to claim 1, wherein the first and second display optical systems display a video having a parallax.

9. A control method which is executed by a display device including first and second display optical systems that display a video for each of a user's left eye and right eye, the control method comprising:
calculating an object position of a display object in the video displayed by the first and second display optical systems; and
changing a diopter related to the first and second display optical systems based on information of the object position and information of usage conditions of the display device.

10. A non-transitory recording medium storing a control program causing a computer to perform each step of a control method of a display device including first and second display optical systems that display a video for each of a user's left eye and right eye, the control method comprising:
calculating an object position of a display object in the video displayed by the first and second display optical systems; and
changing a diopter related to the first and second display optical systems based on information of the object position and information of usage conditions of the display device.

* * * * *